(12) United States Patent
Yontz

(10) Patent No.: US 9,067,105 B2
(45) Date of Patent: Jun. 30, 2015

(54) GOLF BALL HAVING A COVER LAYER WITH TWO DIFFERENT HARDNESS VALUES

(75) Inventor: Nicholas Yontz, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 462 days.

(21) Appl. No.: 13/485,316

(22) Filed: May 31, 2012

(65) Prior Publication Data
US 2013/0324323 A1 Dec. 5, 2013

(51) Int. Cl.
| | | |
|---|---|---|
| *A63B 37/02* | (2006.01) | |
| *A63B 43/00* | (2006.01) | |
| *A63B 37/00* | (2006.01) | |
| *B29C 45/16* | (2006.01) | |
| *A63B 45/00* | (2006.01) | |
| *B29C 43/02* | (2006.01) | |
| *B29C 43/14* | (2006.01) | |
| *B29C 43/18* | (2006.01) | |
| *B29L 31/54* | (2006.01) | |

(52) U.S. Cl.
CPC ........... *A63B 43/008* (2013.01); *A63B 37/0032* (2013.01); *B29L 2031/546* (2013.01); *B29C 45/1671* (2013.01); *A63B 37/0006* (2013.01); *A63B 37/002* (2013.01); *A63B 37/0022* (2013.01); *A63B 37/0031* (2013.01); *A63B 37/0074* (2013.01); *A63B 37/0075* (2013.01); *A63B 37/0076* (2013.01); *A63B 37/0084* (2013.01); *A63B 37/0096* (2013.01); *A63B 45/00* (2013.01); *A63B 37/0029* (2013.01); *A63B 37/0003* (2013.01); *A63B 37/0023* (2013.01); *B29C 43/027* (2013.01); *B29C 43/146* (2013.01); *B29C 43/18* (2013.01)

(58) Field of Classification Search
CPC .......... A63B 37/0023; A63B 37/0031; A63B 37/0032
USPC .................................... 473/378, 385
See application file for complete search history.

(56) References Cited

U.S. PATENT DOCUMENTS

| | | | | |
|---|---|---|---|---|
| 1,482,232 | A * | 1/1924 | Hazeltine | 473/377 |
| 3,454,280 | A | 7/1969 | Harrison et al. | |
| 3,819,768 | A | 6/1974 | Molitor | |
| 4,323,247 | A | 4/1982 | Keches et al. | |
| 4,526,375 | A | 7/1985 | Nakade | |
| 4,884,814 | A | 12/1989 | Sullivan | |
| 4,911,451 | A | 3/1990 | Sullivan et al. | |
| 4,949,976 | A * | 8/1990 | Gobush | 473/379 |
| 5,873,796 | A | 2/1999 | Cavallaro et al. | |
| 5,984,807 | A * | 11/1999 | Wai et al. | 473/376 |
| 5,994,472 | A | 11/1999 | Egashira et al. | |
| 6,012,992 | A * | 1/2000 | Yavitz | 473/378 |
| 6,200,239 | B1 * | 3/2001 | Kennedy et al. | 473/604 |
| 6,392,002 | B1 | 5/2002 | Wu | |
| 6,422,954 | B1 | 7/2002 | Dewanjee | |
| 6,433,094 | B1 | 8/2002 | Nesbitt et al. | |
| 6,503,155 | B2 * | 1/2003 | Maruko et al. | 473/370 |
| 6,508,726 | B1 * | 1/2003 | Yamagishi et al. | 473/378 |
| 6,575,847 | B1 * | 6/2003 | Yamagishi et al. | 473/374 |
| 6,648,778 | B2 * | 11/2003 | Sullivan et al. | 473/377 |

(Continued)

*Primary Examiner* — John E Simms, Jr.
(74) *Attorney, Agent, or Firm* — Quinn Law Group, PLLC

(57) ABSTRACT

The disclosure relates to a golf ball having a cover layer including a first cover layer portion having one hardness values and a second cover layer portion having a second hardness value. The disclosure further relates to methods of making such a golf ball.

20 Claims, 17 Drawing Sheets

(56) References Cited

U.S. PATENT DOCUMENTS

| | | |
|---|---|---|
| 6,835,793 B2 | 12/2004 | Yokota et al. |
| 7,470,203 B1* | 12/2008 | Stillinger ................ 473/596 |
| 2001/0019973 A1* | 9/2001 | Maruko et al. ............ 473/374 |
| 2007/0026969 A1* | 2/2007 | Melanson et al. ......... 473/371 |
| 2012/0010025 A1* | 1/2012 | Chou et al. .............. 473/378 |
| 2013/0165270 A1* | 6/2013 | Alan ..................... 473/378 |
| 2013/0165271 A1* | 6/2013 | Lee ...................... 473/378 |
| 2013/0225332 A1* | 8/2013 | Yeh et al. ............... 473/374 |

\* cited by examiner

GOLF BALL HAVING A COVER LAYER WITH TWO DIFFERENT HARDNESS VALUES

BACKGROUND

The present disclosure relates generally to a golf ball having a cover layer with at least two cover layer portions having different hardness values. In addition, the present disclosure relates generally to a method of making such a golf ball.

The game of golf is an increasingly popular sport at both the amateur and professional levels. A wide range of technologies related to the manufacture and design of golf balls are known in the art. Such technologies have resulted in golf balls with a variety of play characteristics. For example, different golf balls are manufactured and marketed to players having different golfing abilities, such as different swing speeds.

Similarly, a golfer may use different golf balls having different play characteristics depending on the golfer's preferences. For example, different dimple patterns may affect the aerodynamic properties of the golf ball during flight, or a difference in the hardness may affect the rate of backspin. With regard to hardness in particular, a golfer may choose to use a golf ball having a cover layer and/or a core that is harder or softer. A harder golf ball will generally achieve greater distances but less spin, and, therefore, will be better for drives but more difficult to control on shorter shots. On the other hand, a softer golf ball will generally experience more spin and, therefore, may be easier to control, but will lack distance.

Additionally, the spin rates of golf balls affect the overall control of the balls in accordance to the skill level of the players. Low spin rates provide improved driver and long-iron distance, but make golf balls difficult to stop on shorter shots, such as approach shots to greens. High spin rates allow more skilled players to maximize control of the golf ball, but may adversely affect driver and long-iron distance. To strike a balance between the spin rates and the playing characteristics of golf balls, additional layers, such as intermediate layers, outer core layers and inner cover layers are added to solid golf balls to improve the playing characteristics of the ball. The addition of multiple layers may add to the complexity of the manufacturing process as well as to the expense of manufacturing a golf ball.

While a variety of types of golf balls exist for different play characteristics, amateur golfers generally prefer to minimize the costs of purchasing new golf balls. However, a golfer may be required to purchase several sets of golf balls in order to achieve different play characteristics. For example, a golfer may purchase and use a set of hard golf balls for use specifically on longer courses, when the improved distance achieved by hard golf balls will be advantageous. In addition, a golfer may purchase and use a set of soft golf balls for use on shorter courses, or for use under conditions requiring increased control such as cold or wet weather. The need to purchase, store and carry several sets of golf balls in order to achieve a variety of play characteristics presents an inconvenience to the golfer, as well as increased costs.

Therefore, there is a need in the art for a system and method that addresses the shortcomings of the prior art discussed above.

SUMMARY

A golf ball and a method of making a golf ball are disclosed. The golf ball may generally include an inner ball and a cover layer. The cover layer of the golf ball may include two cover layer portions. The portions of the cover layer may have two different hardness values.

In one aspect, the disclosure relates to a golf ball having a cover layer with at least two cover layer portions having different hardness values. The difference in hardness values of the cover layer portions may range from about 1 to about 15 units on the Shore scale, and more typically between about 1 and about 10 units, and further typically between about 1 and about 7 units.

In another aspect, the disclosure relates to a method of making a golf ball having a cover layer with at least two cover layer portions having different hardness values. In some embodiments the cover layer comprises two hemispheres. The hemispheres may be formed prior to being applied to an inner ball. The preformed cover layer hemispheres may be joined to encompass an inner ball. In other embodiments, the cover layer hemispheres are formed as they are applied to an inner ball.

In one aspect, the cover layer hemispheres are formed prior to being applied to an inner ball and joined by compression molding.

In another aspect, the cover layer hemispheres may be formed prior to being applied to an inner ball and joined by injection molding.

In one aspect, when the cover layer hemispheres are formed prior to application to the inner ball, the hemispheres may be applied to the inner ball by compression molding.

In another aspect, when the cover layer hemispheres are formed prior to application to the inner ball, the hemispheres may be applied to the inner ball by welding methods. Embodiments of the disclosure include spin welding methods as the welding method.

In still another aspect, when the cover layer hemispheres are not formed prior to application on the inner ball, the cover layer hemispheres may be applied to the inner ball by any known method of applying a cover to an inner ball. In some embodiments, the cover layer hemispheres may be applied to the inner ball compression molding. In other embodiments, the cover layer hemispheres may be applied to the inner ball by injection molding.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

The present disclosure generally relates to a golf ball having a first portion of a cover layer that is of one hardness value (for example, relatively hard) and a second portion of the cover layer that is of a second hardness value (for example, relatively soft). The first area is a contiguous hemisphere comprising approximately half of the golf ball cover layer. The second area is a second contiguous hemisphere comprising approximately a second half of the golf ball cover layer. As a result of such a cover layer, the golf ball may have one half of the golf ball that may be struck by a driver or wood to achieve greater distance and a second half of a golf ball that may be struck by a short iron or wedge to achieve greater control.

This disclosure further relates to methods of manufacturing such a golf ball. The methods of the disclosure include any suitable method for applying a cover layer to an inner ball. The cover layer may include two cover layer hemispheres. The cover layer hemispheres may be formed prior to their application on an inner ball. The cover layer hemispheres may be formed as they are being applied to an inner ball. In some embodiments, the cover layer hemispheres may be formed by compression molding. In other embodiments, the cover layer hemispheres may be formed by injection molding. Further, the cover layer hemispheres may be applied to the inner ball by compression molding. Still further, the cover layer hemispheres may be applied to the inner ball by injection molding. In further embodiments, a welding method may be used to join a first cover layer hemisphere to a second cover layer hemisphere.

The aspects of this disclosure relate to the use of cover layer having different hardness values that may be applied to any inner ball having any number of layers or pieces. The construction of a golf ball made according to the present method is not limited to the embodiments mentioned with specificity herein. For example, a golf ball in accordance with this disclosure may generally take any construction, such as a conforming or non-conforming construction. Conforming golf balls are golf balls which meet the Rules of Golf as approved by the United States Golf Association (USGA).

Figure 1:
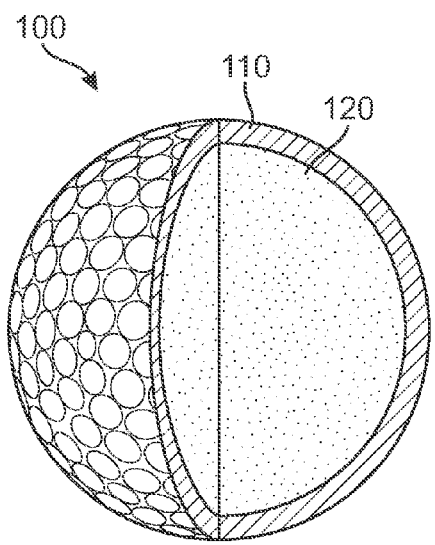
FIG. 1 shows an embodiment of a golf ball having aspects in accordance with this disclosure, the golf ball being of a two-piece construction.
Figure 2:
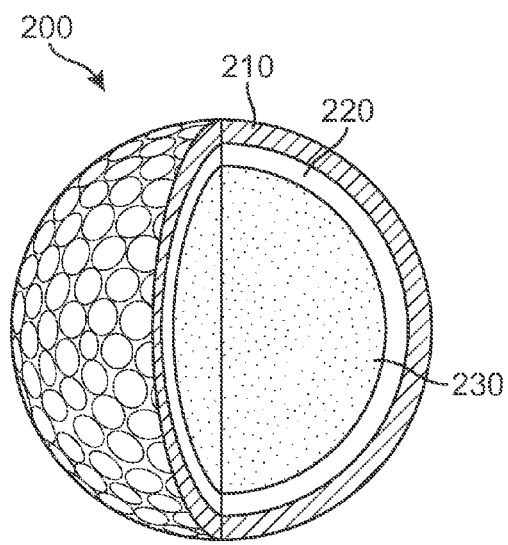
FIG. 2 shows an embodiment of a second golf ball having aspects in accordance with this disclosure, the second golf ball having an inner cover layer and an outer cover layer.
Figure 3:
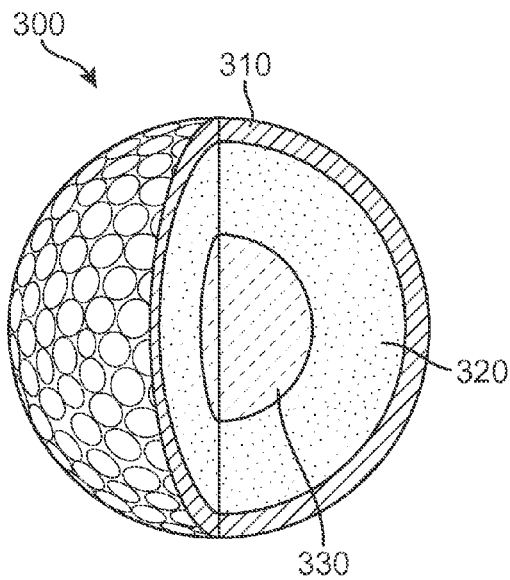
FIG. 3 shows an embodiment of a third golf ball having aspects in accordance with this disclosure, the third golf ball having an inner core layer and an outer core layer.
Figure 4:
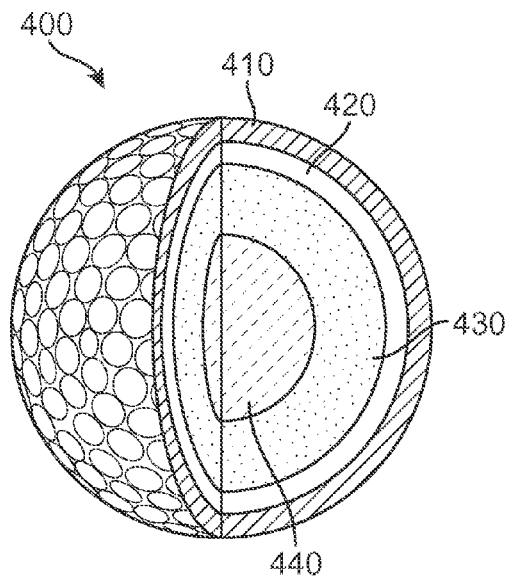
FIG. 4 shows an embodiment of a fourth golf ball having aspects in accordance with this disclosure, the four golf ball having an inner core layer, an outer core layer, an inner cover layer, and an outer cover layer.

Thus, the disclosure herein can be applied to any of the balls illustrated in FIGS. 1-4. For example, FIG. 1 shows a golf ball 100 having a two-piece construction comprising core 120 and cover layer 110. FIG. 2 shows a second golf ball 200 having a three-piece construction comprising core 230, inner cover layer 220, and an outer cover layer 210. FIG. 3 shows a third golf ball 300 having a three-piece construction comprising inner core layer 330, an outer core layer 320, and outer cover layer 310. FIG. 4 shows a fourth golf ball 400 having inner core layer 440, outer core layer 430, inner cover layer 420, and outer cover layer 410. Typically, each layer essentially encompasses interior layers.

The disclosure thus encompasses these golf balls, and golf balls having 5 or more layers or pieces. However, for convenience herein, the disclosure will be directed to a cover layer that encompasses an inner ball. For purposes of this disclosure, an inner ball may be one or more preselected layers or pieces but not an outer cover layer. In other words, the inner ball is all of the components encompassed by the cover layer, but not including the cover layer.

As discussed above, the present disclosure relates to a golf ball having a cover layer having a first portion that is of one hardness value and a second portion that is of a second hardness value. The hardness of a golf ball layer is measured generally in accordance with ASTM D-2240, but measured on the land area on a curved surface of a molded golf ball. For purposes of this disclosure, the hardness values will be in accordance with the Shore D hardness scale. Shore D hardness values of the cover layer were measured on the spherical surface of the layer and were measured by using a Shore D hardness tester.

Golf ball cover layers typically have a Shore D hardness value ranging from about 20 to about 80, more typically from about 35 to about 75. The first cover layer portion and the second cover layer portion can have any suitable Shore D hardness value. Embodiments of the disclosure include a golf ball cover layer having a first cover layer portion that has a hardness that is greater than the hardness of a second cover layer portion. In other embodiments, the hardness of a first cover layer portion is less than the hardness of a second cover layer portion.

However, the difference of hardness value of the first cover layer portion and the hardness value of the second cover layer portion may be between about 1 and about 15 units on the Shore scale. In other embodiments, the difference in hardness values may be between about 1 and about 10 units. Further, embodiments of the disclosure may have a difference in hardness values from about 1 to about 6 units.

A golf ball having a cover layer with two cover layer portions with different hardness allows the golfer to choose the side of the golf ball the golfer desires to strike with a golf club. In some instances, a golfer may choose to hit the cover layer portion that has a greater hardness value when driving the golf ball off a tee or when using fairway woods or long-irons. Striking the harder cover layer portion with a wood or long-iron may provide the distance a golfer would expect when using such clubs. Further, striking the harder cover layer portion of the golf ball may also provide less backspin, which will assist with maintaining the driving distance.

In other instances, a golfer may choose to strike the softer cover layer portion with a short iron or wedge, or even a putter. Striking the softer cover layer portion may provide greater backspin. Further, striking the softer cover layer portion may also provide better control of the golf ball.

Embodiments of the disclosure include a golf ball having a cover layer comprising a first cover layer portion having a first hardness and a second cover layer portion having a second hardness. The first cover layer portion and second cover layer portion may be discernible to a golfer. In some embodiments, the first cover layer portion may be visibly discernible from the second cover layer portion of the golf ball cover layer. In other embodiments, the first cover layer portion may be tactilely discernible from the second cover layer portion. In further embodiments, the first cover layer portion may be both visibly and tactilely discernible from the second cover layer portion.

Figure 5:
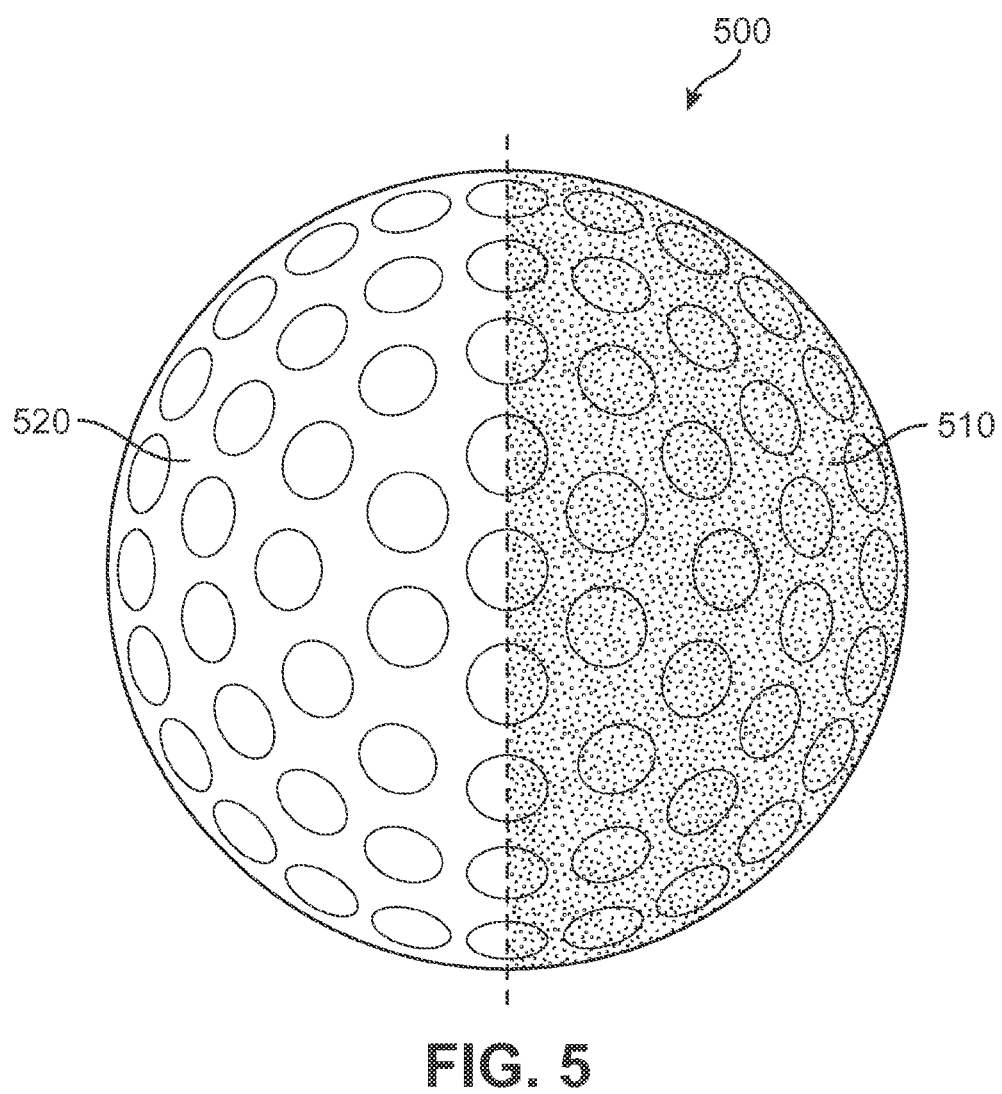
FIG. 5 is an embodiment of a golf ball having a cover layer with two cover layer portions having different hardness values illustrated by the cover layer having two different colors marking the cover layer portions.

In FIG. 5, first cover layer portion 510 of finished golf ball 500 is visually distinguished from second cover layer portion 520. Each cover layer portion may have a different cover. For example, first cover layer portion 510 may have a grey color while second cover layer portion 520 may have a white color.

Figure 6:
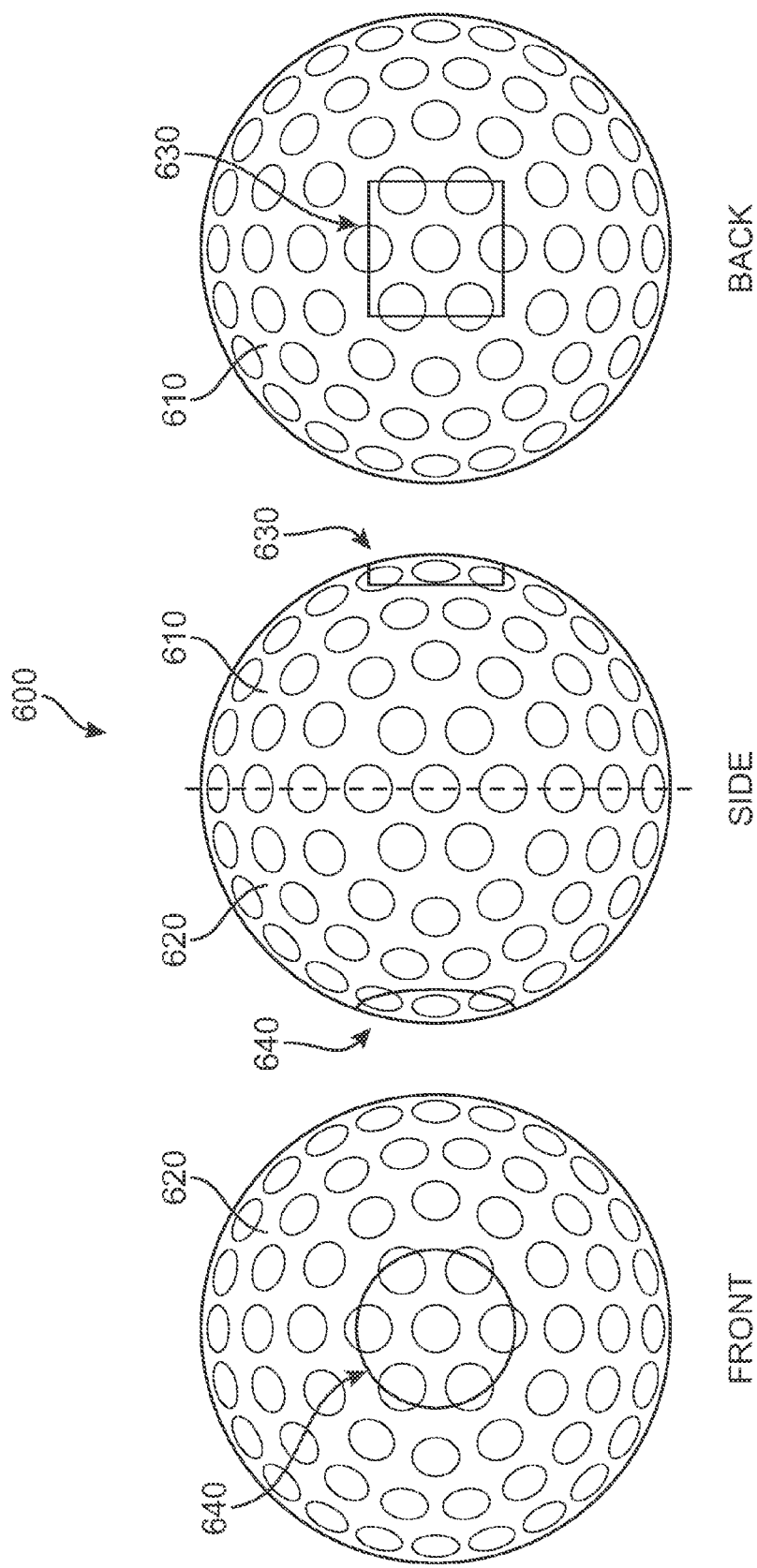
FIG. 6 is an embodiment of a golf ball having a cover layer with two cover layer portions having different hardness values illustrated by the cover layer having two different symbol marking the cover layer portions.

In other embodiments, the finished golf ball may have a stamp or mark noting a first cover layer portion and a second cover layer portion. As seen in FIG. 6, golf ball 600 has a first cover layer portion 610 and a second cover layer portion 620. Golf ball 600 may be a typical white color with a stamp or mark denoting each cover layer portion. The stamp or mark may be any suitable shape. In some embodiments, the stamps may be different shapes.

In FIG. 6, first cover layer portion 610 may be marked with rectangular stamp 630. Second cover layer portion 620 may be marked with circular stamp 640. In one embodiment, the circular stamp may mark the harder of the cover layer portions and the rectangular stamp may mark the softer of the cover layer portions. The shape or design of the stamp marking each cover layer portion can be any suitable design or shape to denote the cover layer portion of the ball being struck by a golf club.

Further, the color of the stamp can be any suitable color the manufacturer chooses. In some embodiments, the stamps may be the same color. In other embodiments, the stamps may be different colors.

The cover layer portions may be further distinguished in both a visibly and a tactilely manner. Typically, golf ball cover layers comprising a plurality of dimples in any pattern. The plurality of dimples may generally be arranged on the cover layer in any pattern, as may be known in the art of golf balls. Various known dimple packing patterns are known in the art. Dimples may generally be of any shape, such as circular, triangular, or multi-sided shapes. Further, dimples may be of uniform shape and size, or the dimple pattern may be of two or more different types of dimples having (for example) different sizes or different shapes. In some embodiments, the cover layer may have two different dimple patterns denoting the two cover layer portions.

Figure 7:
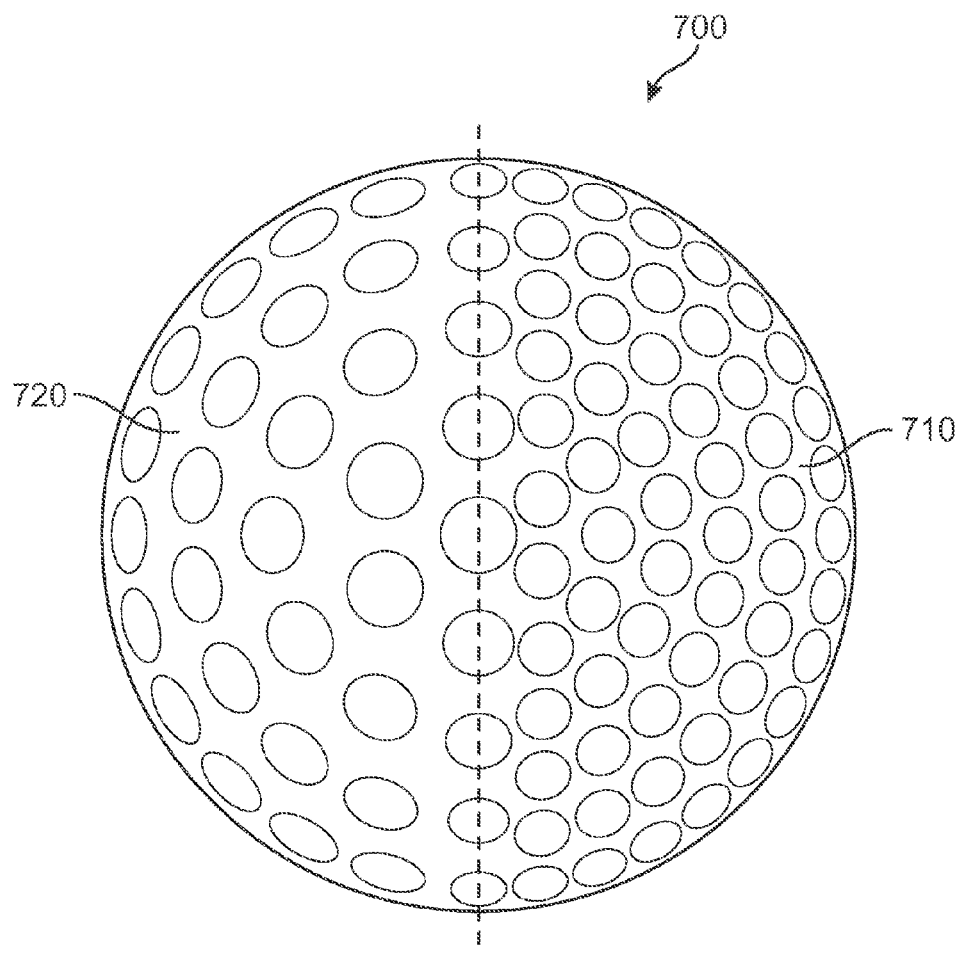
FIG. 7 is an embodiment of a golf ball having a cover layer with two cover layer portions having different hardness values illustrated by the cover layer having two different dimple patterns marking the cover layer portions.

FIG. 7 illustrates golf ball 700 having a cover layer with two different dimple patterns, each pattern comprising a plurality of dimples. First cover layer portion 710 may be distinguished from second cover layer are 720 through different dimple patterns. First cover layer portion 710 may have a dimple pattern comprising a plurality of circular dimples of a smaller size. In contrast, second cover layer are 720 may have a plurality of circular dimples of a larger size. The dimple pattern may be any suitable dimple pattern the manufacturer chooses.

The different dimple patterns may provide a visible method for the golfer to discern which cover layer portion of the finished golf ball the golfer is hitting with a golf club. The dimple pattern may be different enough that the golfer can readily discern which side of the ball the golfer is hitting. Further, the dimple pattern difference may also provide a tactile method for the golfer to discern which cover layer portion of the finished golf ball the golfer is hitting with a golf club. The golfer may be able to feel with their fingers the different dimple patterns to determine the cover layer portion the golfer would like to hit. Again, the dimple pattern difference may be different enough for the golfer to readily discern the different cover layer portions visually, tactilely, or both.

In addition to each method of marking the different cover layer portions, any combination of the above marking methods may be used. For example, in some embodiments, the cover layer portions may have different stamps and different dimple patterns denoting each cover layer portion. In other embodiments, the cover layer may have two different dimple patterns and the different colors marking each cover layer portion. In further embodiments, the cover layer may have different colors and different stamps marking each cover layer portion. In still other embodiments, the cover layer may have all three methods, different stamps, different colors and different dimple patterns, for marking the cover layer portions.

Figure 8:
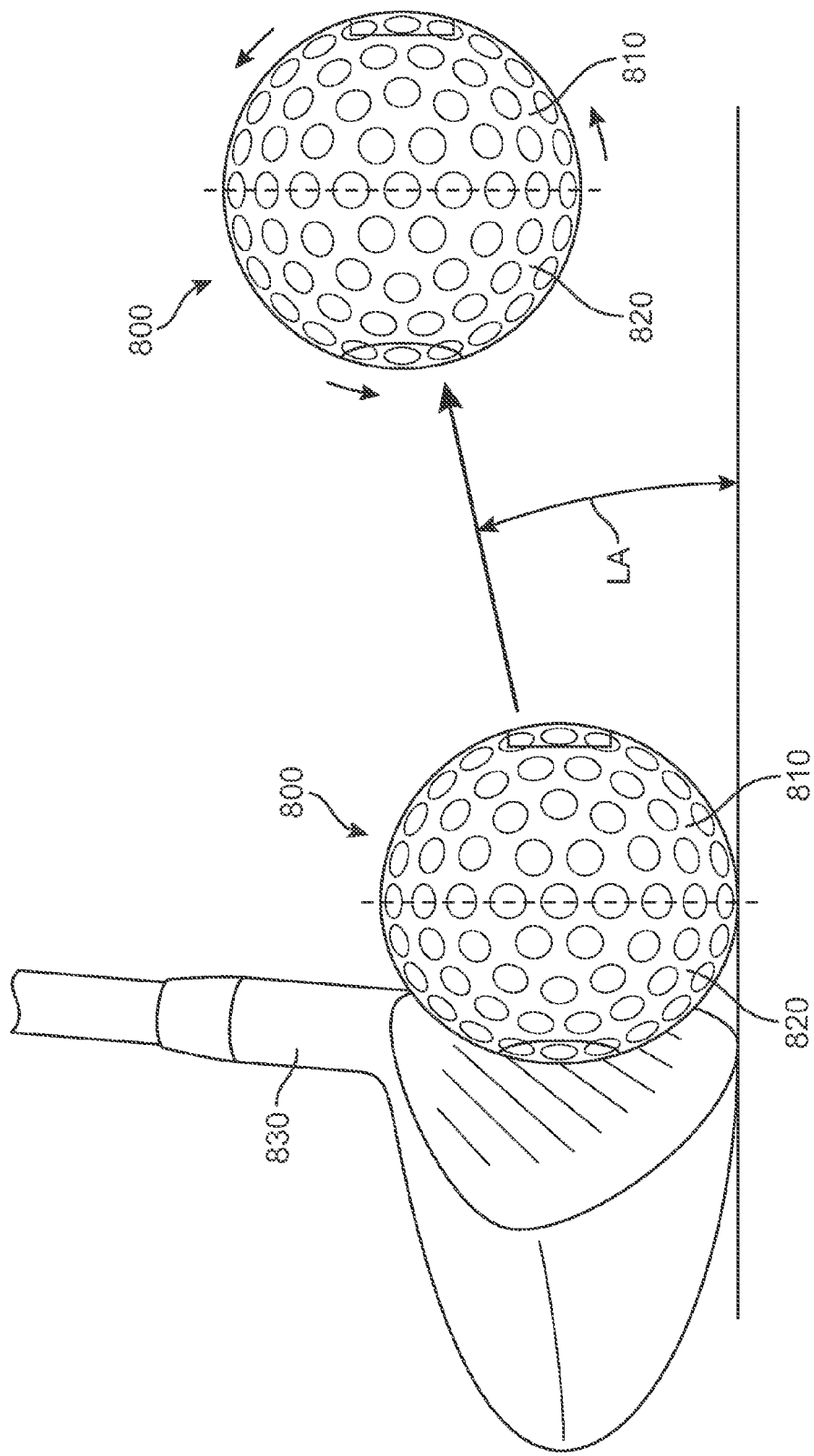
FIG. 8 shows an embodiment of a golf ball having a cover layer with different hardness values being struck by a wood on the harder face of the golf ball.

As stated above, a golfer may choose one face of the golf ball over the other when hitting the golf ball with a golf club. For example, as illustrated in FIG. 8, a golfer may choose to strike the harder face of the golf ball. In some embodiments, as illustrated in FIG. 6, the circular mark on the golf ball indicates the harder of the cover layer portions. FIG. 8 shows a driver or wood striking the golf ball of FIG. 6.

In FIG. 8, golf club 830 strikes golf ball 800 on cover layer portion 820. When struck with this type of club on the harder cover layer portion, the launch angle of the ball is lower, when compared to being struck with a short iron or wedge. In addition, striking golf ball 800 with a wood or long-iron on harder cover layer portion 820 produces less spin on the golf ball, as indicated by the short arrows rotating about golf ball 800.

A finished golf ball is typically tested to determine a wide variety of play characteristics. For example, a golf ball may be struck with one or more golf clubs in a test facility. During testing, characteristics, such as initial velocity, launch angle and the back pin of the golf ball are measured.

In some instances, a finished golf balls may be hit in an indoor range with a driver swung at a particular head speed, for example, between about 125 mile per hour and about 140 miles per hour (mph). When struck with a driver at those speeds, a typical golf ball exhibits a backspin of between about 2400 and about 3200 revolutions per minute (RPMs). In addition to a lower backspin, a finished golf ball may have an initial velocity of about 136 to about 142 mph. The launch angle of the golf ball may be between about 8° and about 12°.

The golf ball of the present disclosure may exhibit similar characteristics when struck with a wood or long-iron on the harder face of the cover layer. The golf ball may have an initial velocity between about 136 to about 142 mph, a launch angle between about 8° and about 12°, and a backspin rate of between about 2400 and about 3200 rpms.

Figure 9:
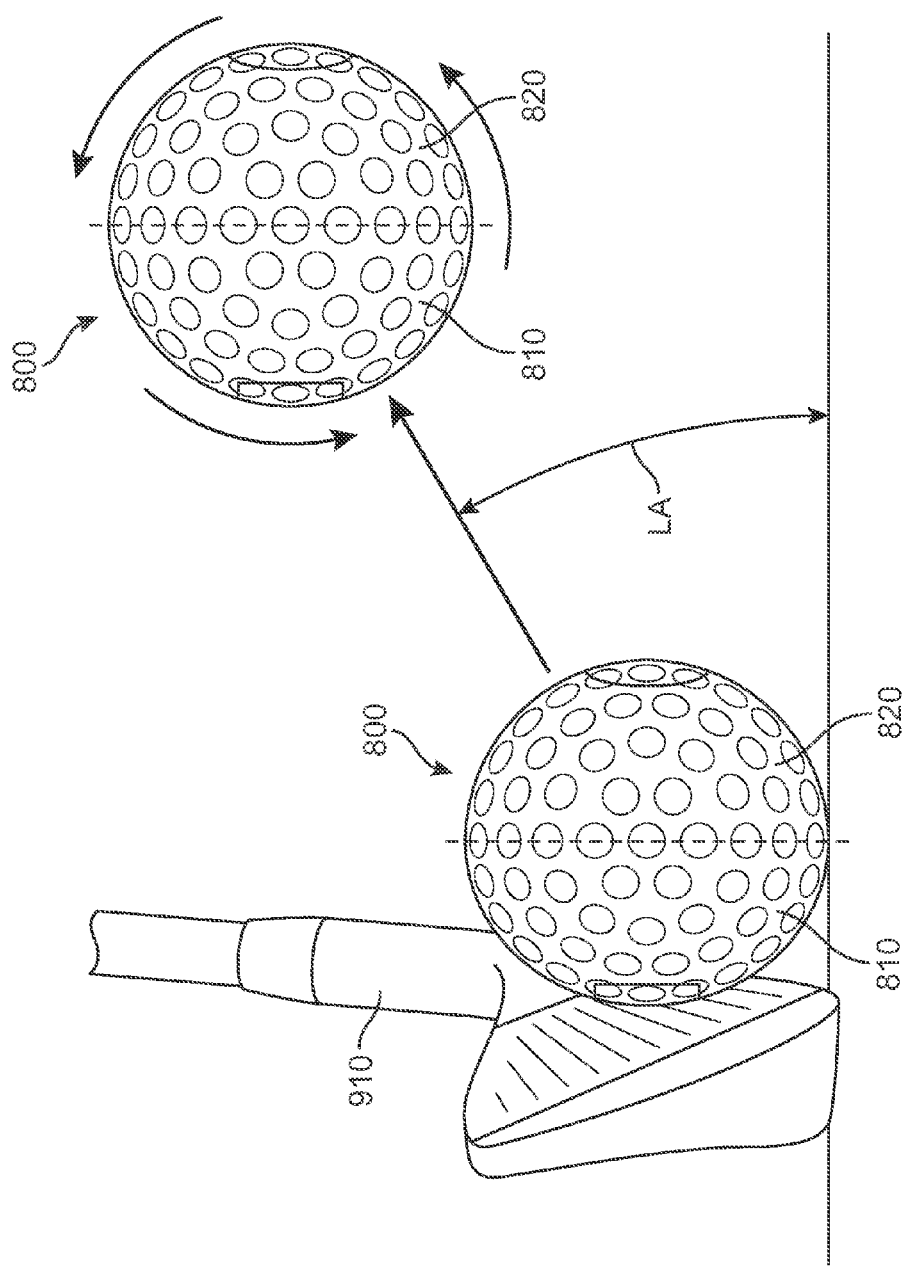
FIG. 9 shows an embodiment of a golf ball having a cover layer with different hardness values being struck by a short iron or wedge on the softer face of the golf ball.

In contrast to FIG. 8, FIG. 9 illustrates short iron or wedge 910 striking golf ball 800 on softer cover layer portion 810. In comparison to being struck with a wood on larder cover layer portion 820, when struck with a short iron or wedge on the softer cover layer portion, golf ball 800 has a higher launch angle and is subject to greater backspin.

Finished golf balls are also often tested with irons or wedges to determine play characteristics.

Finished golf balls also may be tested in an indoor range while being struck with an iron, for example a 6 iron. Striking a golf ball that has a softer cover may result in a golf ball that is more controllable. Hitting a golf ball with a softer cover with such a dub may provide greater backspin. For example, the backspin of a golf ball with a soft cover when struck with an iron, such as a 6 iron, may be between about 5200 and about 6100 RPMs. Further, the launch angle of a golf ball with a softer cover when struck with a wedge may be between about 16° and about 19°. Finally, the initial velocity of a golf ball with a softer cover layer when struck with a short iron or wedge may be between about 107 mph and about 110 mph.

Again, the golf ball of the present disclosure may exhibit similar characteristics when struck with an iron on the softer face of the cover layer. The golf ball may have an initial velocity between about 107 to about 110 mph, a launch angle between about 16° and about 19°, and a backspin rate of between about 5200 and about 6100 rpm.

Finished golf balls also may be tested in an indoor range while being struck with a wedge. Striking a golf ball that has a softer cover may result in a golf ball that is more controllable. Hitting a golf ball with a softer cover with such a club may provide greater backspin. For example, the backspin of a golf ball with a soft cover when struck with a full wedge, as opposed to chipping the ball with a wedge, may be between about 8400 and about 9100 RPMs. Further, the launch angle of a golf ball with a softer cover when struck with a full wedge may be between about 25° and about 38°. Finally, the initial velocity of a golf ball with a softer cover layer when struck with a full wedge may be between about 82 and about 85 mph.

Again, the golf ball of the present disclosure may exhibit similar characteristics when struck with a full wedge on the softer face of the cover layer. The golf ball may have an initial velocity between about 82 to about 85 mph, a launch angle between about 25° and about 38°, and a backspin rate of between about 8500 and about 9100 rpm.

Further, finished golf balls also may be tested in an indoor range while being struck with a wedge to chip the golf ball. Striking a golf ball that has a softer cover may result in a golf ball that is more controllable. Hitting a golf ball with a softer cover with such a club may provide greater backspin. For example, the backspin of a golf ball with a soft cover when struck with a wedge to chip the ball may be between about 5300 and about 8500 RPMs. Further, the launch angle of a golf ball with a softer cover when struck with a full wedge may be between about 25° and about 38°. Finally, the initial velocity of a golf ball with a softer cover layer when struck with a full wedge may be between about 45 and about 54 mph.

Again, the golf ball of the present disclosure may exhibit similar characteristics when struck with a full wedge on the softer face of the cover layer. The golf ball may have an initial velocity between about 45 to about 54 mph, a launch angle between about 25° and about 38°, and a backspin rate of between about 5300 and about 8500 rpm.

The characteristics the golf ball of the present disclosure exhibit may be dictated by which portion of the cover is struck by the golf club. For example, the golf ball of this disclosure may exhibit the characteristics of a ball having a harder cover when struck on the harder portion of the cover. That is, the ball may exhibit the ball speed, spin rate and launch angle of a ball having a harder cover.

Similarly, the golf ball of this disclosure may exhibit the characteristics of a ball having a softer cover when struck on the softer portion of the cover. That is, the ball may exhibit the ball speed, spin rate and launch angle of a ball having a softer cover.

Golf ball covers are generally divided into two types: thermoplastic covers and thermoset covers. Thermoplastic polymer materials may be reversibly melted, and so may be used in a variety of manufacturing methods, such as compression molding, that take advantage of this property. On the other hand, thermoset polymer materials are generally formed by mixing two or more components to form a cured polymer material that cannot be re-melted or re-worked. Each type of polymer material present advantages and disadvantages when used to manufacture golf balls.

Thermoplastic materials for golf ball covers usually include ionomer resin, highly neutralized acid polymer composition, polyamide resin, polyester resin, polyurethane resin, and mixtures thereof. Among these, ionomer resin and polyurethane resin are popular materials for golf ball covers.

Ionomer materials are also known to be used in golf ball construction. Generally, ionomer polymers include any polymer formed from both an electrically neutral monomer and an ionized monomer. Ionomer polymers that are commonly used in golf ball construction are often formed from a short-chain alkene and an organic acid. Ionomer materials include the category of materials referred to as high acid ionomers, and include the category of materials referred to as highly-neutralized polymers, among many others. Example representative ionomer materials are disclosed in: U.S. Pat. No. 5,994,472 to Egashira et al., entitled "Ionomer Covered Golf Ball" and issued on Nov. 20, 1999; U.S. Pat. No. 5,873,796 to Cavallaro et al., entitled "Multi-Layer Golf Ball Comprising a Cover of Ionomer Blends" and issued on Feb. 23, 1999; and U.S. Pat. No. 6,433,094 to Nesbitt et al., entitled "Golf Ball Covers Containing High Acid Ionomers" and issued on Aug. 13, 2002. The disclosures of these three U.S. patents are hereby incorporated by reference. In particular, commonly used ionomer materials include the Surlyn® line of materials commercially available from E.I. du Pont de Nemours and Company.

Ionomer resins, such as Surlyn® products (commercially available from E. I. DuPont de Nemours and Company), have conventionally been used for golf ball covers. For example, Dunlop Rubber Company obtained the first patent on the use of Surlyn® for the cover of a golf ball, U.S. Pat. No. 3,454,280 issued Jul. 8, 1969. Since then, there have been a number of disclosures on the use of ionomer resins in the cover composition of a golf ball, for example, U.S. Pat. Nos. 3,819,768, 4,323,247, 4,526,375, 4,884,814, and 4,911,451.

However, ionomer resin covered golf balls suffer from the problem that the cover surface may be scraped off by grooves on a clubface during repeated shots, particularly with irons. In other words, ionomer covers have poor scuff resistance. Also, ionomer covered balls usually have inferior spin and feel properties as compared to balata rubber or polyurethane covered balls. The use of softer ionomer resins for the cover will improve spin and feel to some extent, but will also compromise the resilience of the golf balls because such balls usually have a lower coefficient of restitution (COR). Furthermore, the scuff resistance of such softer ionomer covers is often still not satisfactory.

On the other hand, thermoset polymer materials such as polyurethane elastomers, polyamide elastomers, polyurea elastomers, diene-containing polymer, cross-linked metallocene catalyzed polyolefin, and silicone, may also be used to manufacture golf balls. Among these materials, thermoset polyurethane elastomers are popular.

Polyurethane materials are known to be used in golf ball construction. Generally, polyurethane polymers are formed from the reaction of a long-chain polyol and a polyisocyanate. Polyurethane includes thermosetting urethane and thermoplastic polyurethanes. A wide range of polyurethane formulations are known to a person having ordinary skill in the art of golf ball manufacturing. Example representative polyurethane compositions are disclosed in: U.S. Pat. No. 6,392,002 to Wu, entitled "Urethane Golf Ball" and issued on May 21, 2002; U.S. Pat. No. 6,835,793 to Yokota et al., entitled "Golf Ball having a Polyurethane Cover" and issued on Dec. 2, 2004; and U.S. Pat. No. 6,422,954 to Dewanjee, entitled "Golf Ball having a Polyurethane Cover" and issued on Jul. 23, 2002. The disclosures of these three U.S. patents are hereby incorporated by reference.

The golf ball of the present disclosure includes a cover layer having two cover layer portions having different hardness values. The material used to form the cover layer portions may be any suitable golf ball cover layer material or combination of materials. The materials used to prepare the cover layer portions may be similar materials or may be different materials. In some embodiments, the cover layer portions may be made of ionomer resins having different hardness values. In other embodiments, the cover layer portions may be made of thermoplastic polyurethanes having different hardness values. In still other embodiments, one cover layer portion may be made of an ionomer resin having one hardness value and a second cover layer portion may be made of a thermoplastic polyurethane having a second hardness value. Again, the cover layer portions may be formed from any suitable golf ball cover layer material, or combination of materials, so long as the hardness value of the first cover layer portion is different from the hardness value of the second cover layer portion.

In those embodiments where the cover layer portions are formed from different materials, additional ingredients may be included. The additional ingredients may assist with joining the cover layer portions. Such ingredients may include compatibility agents or adhesives that assist with the bonding of the cover layer portions.

The golf ball of the disclosure may be made by any suitable method. In addition, the cover layer of the golf ball may be applied to an inner ball by any suitable method. FIGS. 10-23 disclose exemplary methods of forming a dual hardness cover layer on an inner ball.

Figure 10:
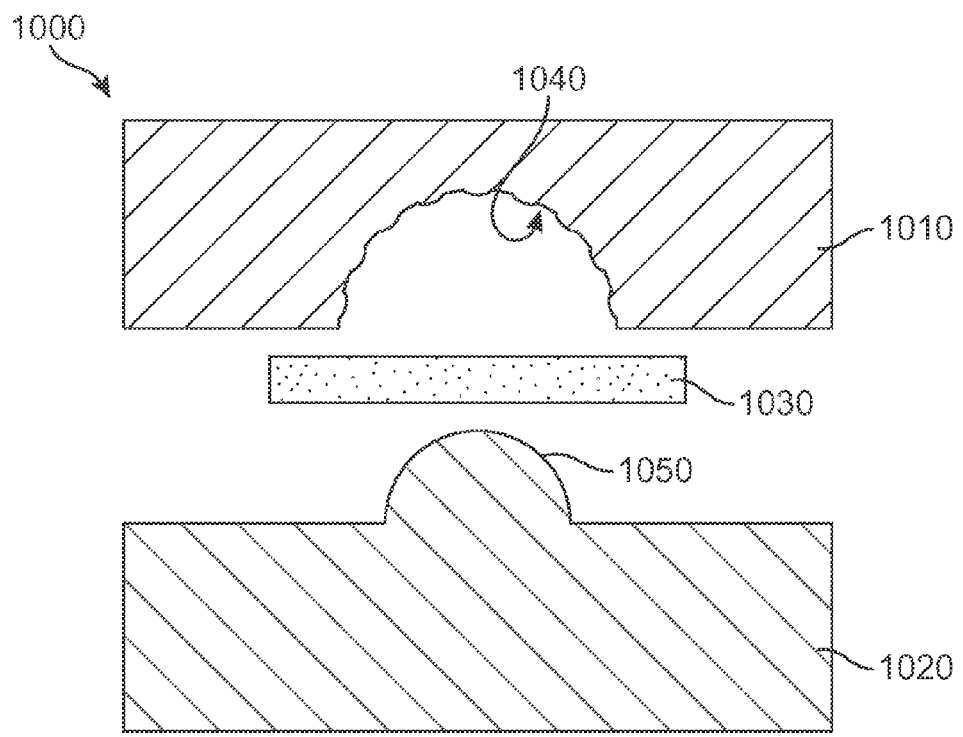
FIG. 10 shows an embodiment of a device for compression molding a hemisphere of the golf ball cover layer.
Figure 11:
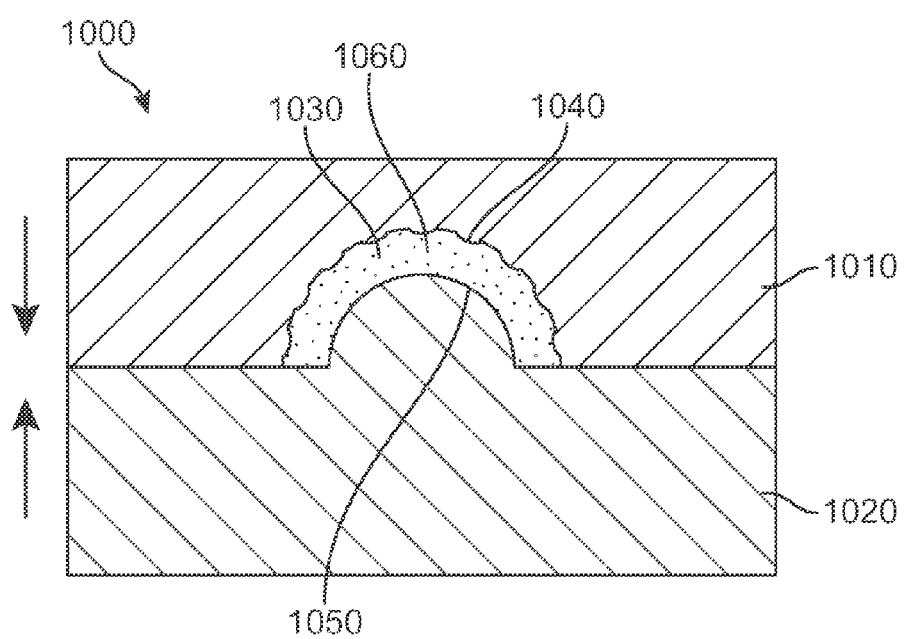
FIG. 11 shows an embodiment of a compression mold under pressure forming the hemisphere of a golf ball cover layer.
Figure 12:
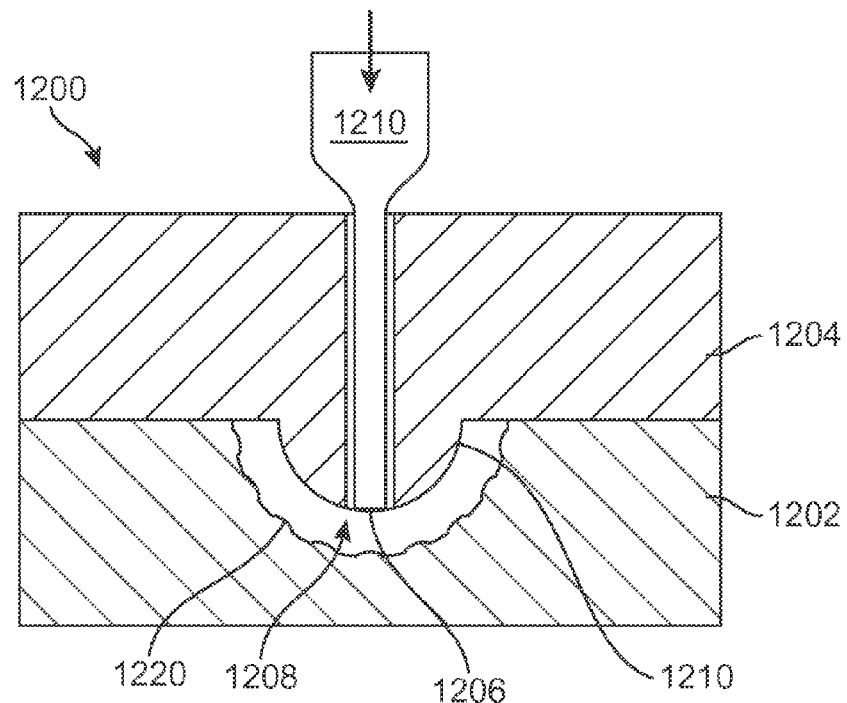
FIG. 12 shows an embodiment of a device for injection molding a hemisphere of the golf ball cover layer.
Figure 13:
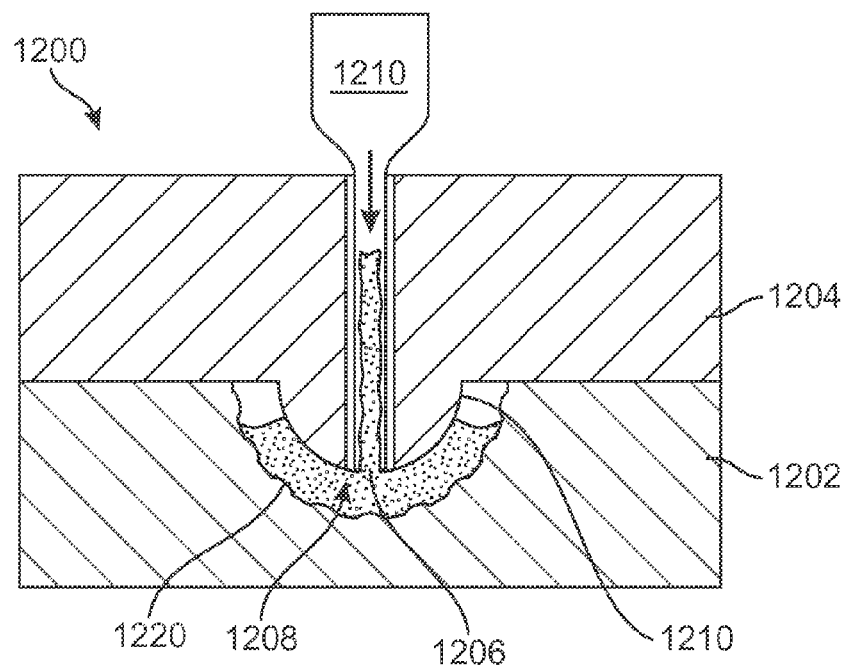
FIG. 13 shows an embodiment of an injection mold being injected with the golf ball cover layer material.

In some embodiments, golf ball cover layer hemispheres may be formed prior to their application to the inner ball. FIGS. 10 and 11 show embodiments of forming a golf ball cover layer hemisphere by compression molding. FIGS. 12 and 13 show embodiments of forming a golf ball cover layer hemisphere by injection molding.

Figure 14:
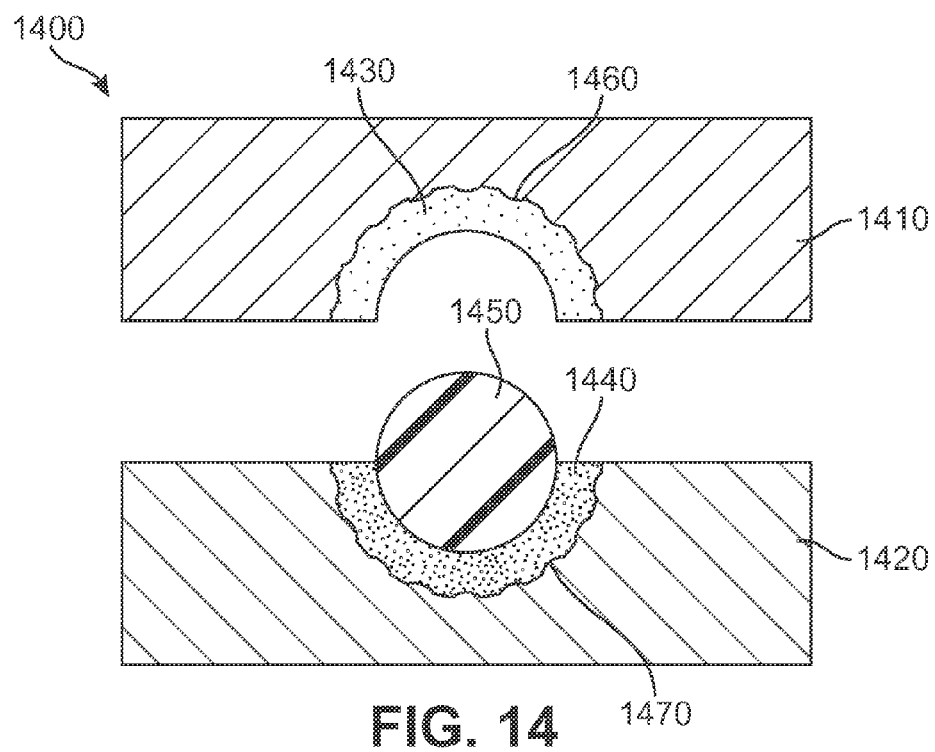
FIG. 14 shows an embodiment of a device for compression molding two preformed hemispheres of the golf ball cover layer onto an inner ball.
Figure 15:
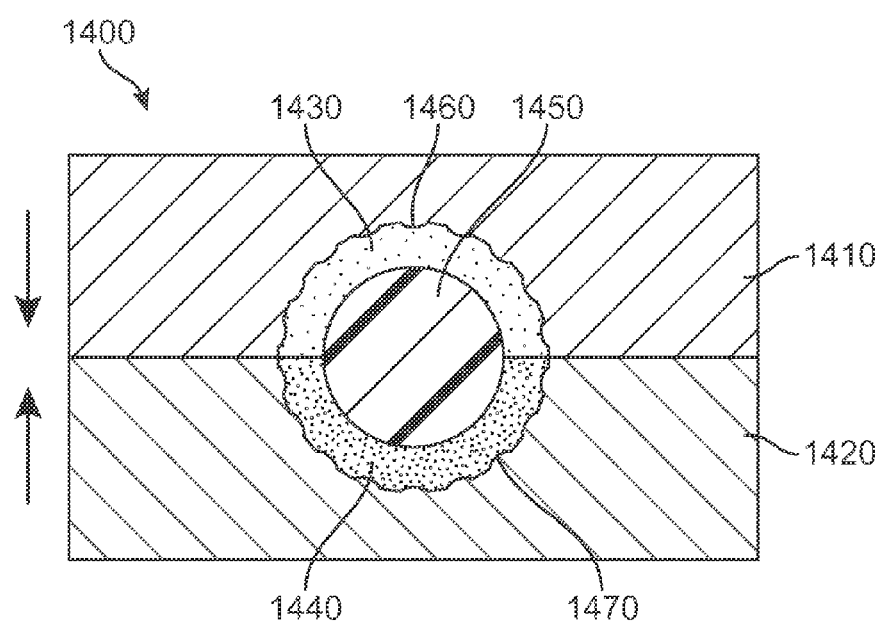
FIG. 15 shows an embodiment of a compression mold under pressure compressing two preformed hemispheres of a golf ball cover layer around an inner ball.
Figure 16:
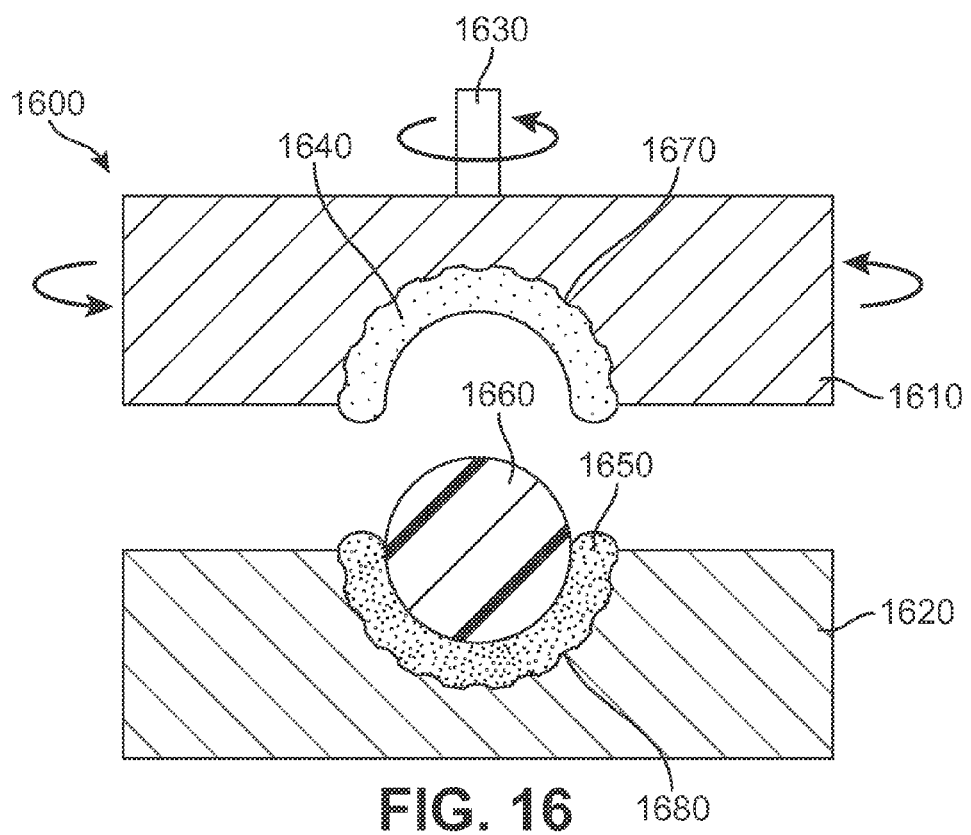
FIG. 16 shows an embodiment of a device for spin welding two hemispheres of the golf ball cover layer onto an inner ball.
Figure 17:
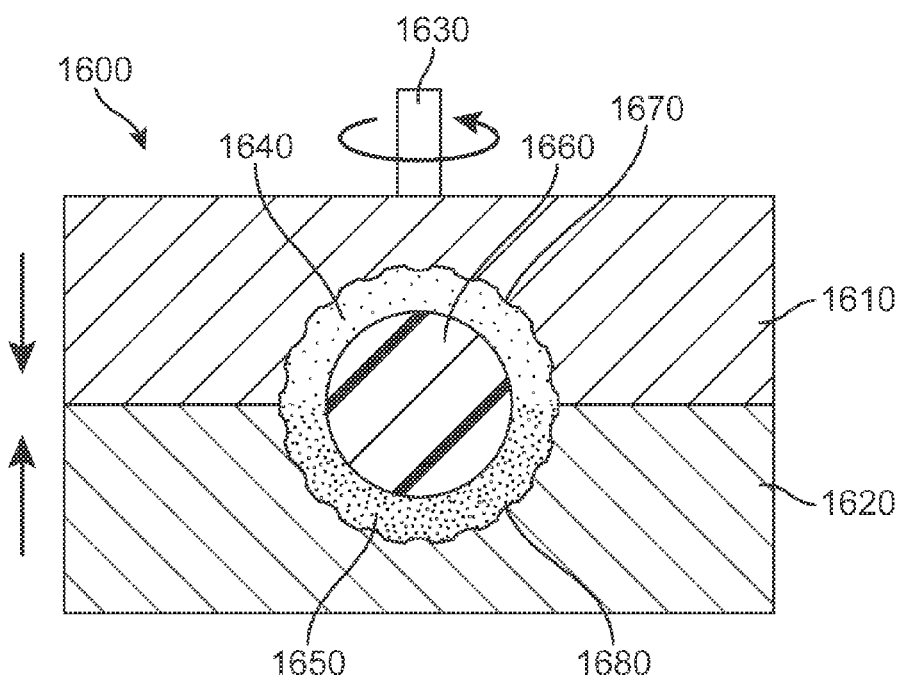
FIG. 17 shows an embodiment of a spin welding device under pressure where two hemispheres of a golf ball cover layer are welded around an inner ball.

In embodiments of the disclosure, preformed cover layer hemispheres may be applied to an inner ball by any suitable method of applying a cover layer to an inner ball. FIGS. 14 and 15 show embodiments of applying preformed cover layer hemispheres to an inner ball by compression molding. FIGS. 16 and 17 show embodiments of applying preformed cover layer hemispheres to an inner ball by a welding method.

Figure 18:
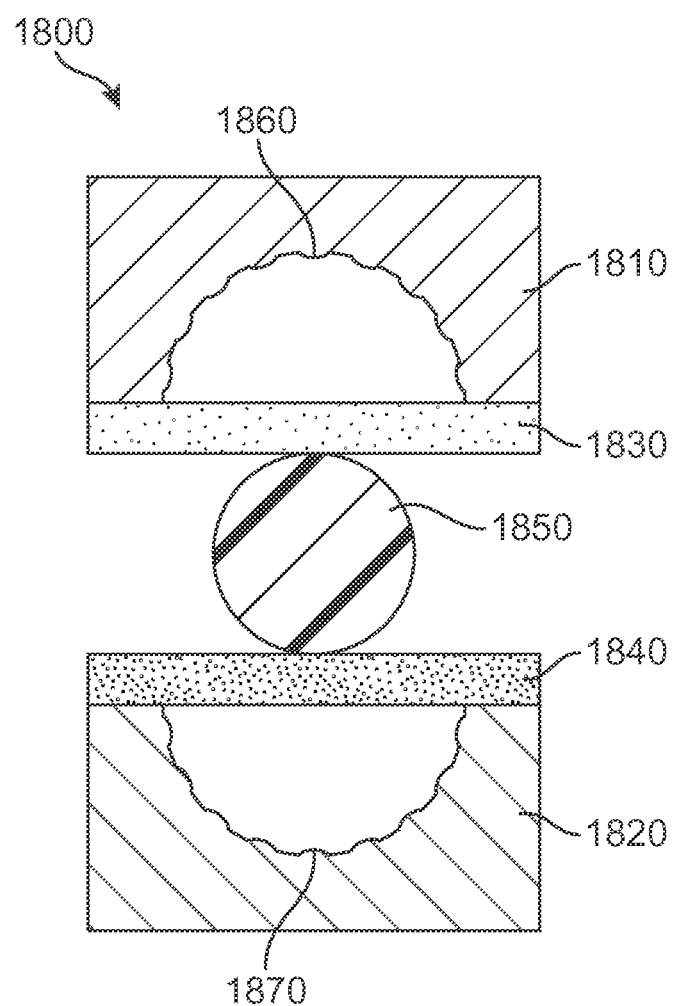
FIG. 18 shows an embodiment of a device for compression molding cover layer materials to form a cover layer having two different hardness values around an inner ball.
Figure 19:
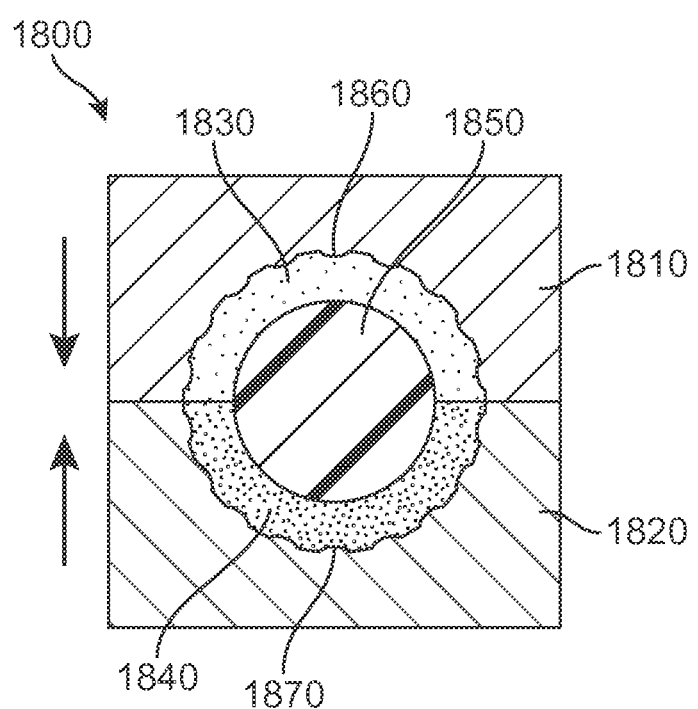
FIG. 19 shows an embodiment of a compression mold under pressure compressing a cover layer having two different hardness values around an inner ball.

In other embodiment, golf ball cover layer hemispheres may be formed as they are being applied to the inner ball. FIGS. 18 and 19 show embodiments of applying a cover layer to an inner ball by compression molding the cover layer material around the inner ball at the same time the cover layer hemispheres are formed. FIGS. 20-23 show embodiments of applying the cover layer hemispheres to an inner ball by injection molding.

In some embodiments, the steps of the exemplary method may be performed in the order in which they are presented. In other embodiments, the steps of the exemplary method may occur in any desired order.

FIG. 10 shows an exemplary compression molding apparatus 1000 including a top mold plate 1010, a bottom mold plate 1020, and raw material 1030 in the form of a plaque or a sheet. Top mold plate 1010 may include a concave portion that shapes the cover layer material into a hemisphere. Top mold plate 1010 may include a surface 1040 having a dimple pattern to mold on to a cover layer hemisphere.

Bottom mold plate 1020 may a smooth convex portion. The convex portion of mold plate 1020 may be hemispherical in shape and substantially similar to the shape of the inner ball. Further, the convex portion of bottom mold plate 1020 may fit inside the concavity of top plate 1010 without touching the dimple pattern portion of the concavity. The distance between the dimpled surface of the concavity of top mold plate 1010 and the smooth surface of the convexity of bottom mold plate 1020 when compressed or joined will vary based on the desired thickness of the cover layer hemisphere being formed. The thickness may be based on a variety of factors. For example, the thickness of the cover layer will depend on the diameter of the inner ball.

Top mold plate 1010 and bottom mold plate 1020 may be configured to be heated. Top mold plate 1010 and bottom mold plate 1020 may be configured to be pressed together such that the convexity of bottom mold plate 1020 may be inserted into the concavity of top mold plate 101 to form a mold chamber 1060, as shown in FIG. 11.

FIG. 11 shows top mold plate 1010 and bottom mold plate 1020 may be moved together. The mold plates may be brought together under pressure at a selected temperature for a selected period of time. As top mold plate 1010 and bottom mold plate 1020 come together they form mold cavity 1060. As shown in FIG. 11, plaque or sheet 1030 of cover layer material is molded into the shape of mold cavity 1060. A cover layer hemisphere formed by the mold may have a dimple pattern on its outer surface and smooth hemispherical shape on its inner surface. The compression between top mold plate 1010 and bottom mold plate 1020 may transform sheet 1030 into a hemisphere having an inner concavity.

In some embodiments, the pressure placed upon the mold plates may range from about 85 kg/cm$^2$ to about 115 kg/cm$^2$. In some embodiments, the pressure may range from about 95 kg/cm$^2$ to about 105 kg/cm$^2$. In some embodiments, the time selected to mold the cover layer hemisphere may range from about 15 seconds to about 105 seconds. In other embodiments, the time may range from about 30 seconds to about 90 seconds. In still further embodiments, the time may range from about 45 seconds to about 75 seconds.

The temperature of the mold during compression will vary based on the material used for the cover layer. Further, in some embodiments, the temperature of the mold during compression may range from about 125° C. to about 195° C. In some embodiments, the temperature may range from about 140° C. to about 180° C. In other embodiments, the temperature may range from about 145° C. to about 170° C.

In some embodiments, once formed, the molded cover layer hemisphere may be cooled and removed from the mold. In other embodiments, the molded cover layer hemisphere is removed from the mold and placed in a further mold to be joined with a second cover layer hemisphere and the inner ball to form a finished golf ball.

In other embodiments, the cover layer hemisphere of the present disclosure may be formed prior to being applied to an inner ball through methods other than compression molding. For example, the cover layer hemisphere may be formed by injection molding. FIG. 12 shows an embodiment of an injection mold 1200.

Mold 1200 may be constructed of multiple portions that may be displaced relative to each other and may be brought together to define a molding chamber 1208 for the cover layer hemisphere. For example, as shown in the embodiment of FIG. 12, mold 1200 may include an upper portion 1204 and a lower portion 1202. Upper portion 1204 and lower portion 1202 may have first interior wall 1210 and second interior wall 1212, respectively, defining a hemispherical cavity when brought together. The interior walls of mold 1200 may include surface features that define corresponding surface features in the cover layer hemisphere. For example, the surface features of the molded layer may be a dimple pattern. Second interior wall 1212 may include such a dimple pattern.

Mold 1200 may also define at least one gate 1206 through which a melt may be injected into the mold cavity 1208 defined by upper mold portion 1204 and lower mold portion 1202. Although the cross-sectional view of FIG. 12 shows one gate 1206, any number of gates may be used, including one or more than two. Multiple gates may be used to promote better distribution of the melt throughout the mold cavity 1208, to avoid, for example, undesirable differences in cooling and hardening in different areas of the mold cavity 1208.

In one embodiment, the molding material may be injected into the mold in liquid form, and then allowed to cool and solidify. As shown in FIG. 13, gate 1206 is opened to allow the molten cover layer material to flow from injector 1210 into mold cavity 1208. Once mold cavity 1208 is filled with the molten cover layer material, the material is allowed to cool and solidify. Once the cover layer hemisphere is cooled and solidified, the cover layer hemisphere may be removed from mold 1200. In some embodiments, the molded cover layer hemisphere is removed from the mold and allowed to continue to cool and solidify. In other embodiments, the molded cover layer hemisphere is removed from the mold and placed in a further mold to be joined with a second cover layer hemisphere and an inner ball to form a finished golf ball.

As discussed above, the golf ball cover layer hemispheres may be formed prior to being applied to the inner ball. After the cover layer hemispheres are formed, they may be applied to an inner ball by any suitable method for applying a preformed hemisphere on an inner ball.

The preformed cover layer hemispheres may be applied to an inner ball by any suitable molding method. In some embodiments, the cover layer hemispheres may be applied to an inner ball through a compression molding method. FIGS. 14 and 15 illustrate applying the cover layer hemispheres to an inner ball through compression molding.

In FIG. 14, mold 1400 may include top mold plate 1410 and bottom mold plate 1420. Top mold plate 1410 and bottom mold plate 1420 may include a first surface 1460 and a second surface 1470, respectively, that contain a dimple pattern. The dimple pattern of first surface 1460 and a second surface 1470 may be substantially similar to the pattern on the preformed cover layer hemisphere placed in each mold plate.

Further, a first cover layer hemisphere 1430 may be placed in top mold plate 1410. First cover layer hemisphere 1430 may be held in top mold 1410 by any suitable method. For example, first cover layer hemisphere 1430 may be held in top mold plate 1410 by suction or under vacuum. Further, bottom mold plate 1420 contains second cover layer hemisphere 1440. In addition, second cover layer hemisphere 1440 may hold inner ball 1450. Further, an adhesive may be applied to either or both of the joining edges of the first cover layer hemisphere 1430 and second cover layer hemisphere 1440 prior to compression.

Similar to the compression molding method described above for preparing the cover layer hemisphere, top mold plate 1410 and bottom mold plate 1420 may be configured to be heated. Top mold plate 1410 and bottom mold plate 1420 may be configured to be pressed together such that first cover layer hemisphere 1430 and second cover layer hemisphere 1440 are applied to inner ball 1450. In addition, first cover layer hemisphere 1430 and second cover layer hemisphere 1440 may be joined during this process. The pressure and heat applied to the first cover layer hemisphere 1430 and second cover layer hemisphere 1440 may soften or melt the material of each hemisphere to the point where the two hemispheres may be joined or fused. The joined or fused cover layer hemispheres may form a substantially complete cover layer encompassing the inner ball.

Further, FIG. 15 shows top mold plate 1410 and bottom mold plate 1420 may be moved together. The two mold plates also may be brought together under pressure at a selected temperature for a selected period of time. As top mold plate 1410 and bottom mold plate 1420 come together, first cover layer portion 1430 and second cover layer portion 1440 may substantially encompass inner ball 1450. The time, temperature and pressure may fall within the ranges discussed above, and incorporated here in their entirety. In some embodiments, once formed in the mold for the selected amount of time, the finished golf ball may be cooled and removed from the mold.

In other embodiments, the preformed cover layer hemispheres may be applied to an inner ball by a welding method. The welding method may be a friction welding method. The cover layer hemispheres may be joined or fused by any suitable friction welding method. In some embodiments, the cover layer hemispheres may be joined around an inner ball through a spin welding method.

FIGS. 16 and 17 illustrate such a method. In FIG. 16, spin welding mold 1600 may include top portion 1610 and bottom portion 1620. Top portion 1610 and bottom portion 1620 may include a first surface 1670 and a second surface 1680, respectively, that contain a substantially similar dimple pattern as the pattern on the cover layer hemisphere placed in each portion.

Further, top portion 1610 contains first cover layer hemisphere 1640. First over layer hemisphere 1640 can be held in top portion 1610 by any suitable method. For example, first cover layer hemisphere 1640 may be held in top portion 1610 by suction or under vacuum. Further, bottom portion 1620 contains second cover layer hemisphere 1650. In addition, second cover layer hemisphere 1650 may hold inner ball 1660. As illustrated in FIG. 16, both first cover layer hemisphere 1640 and second cover layer hemisphere 1650 may have additional material at the joining edges of each hemisphere. This excess material may be used to join together or form a bond between the cover layer hemispheres.

Similar to the compression molding method described above, top portion 1610 and bottom portion 1620 may be configured to be heated. Top portion 1610 and bottom portion 1620 may be configured to be pressed together such that first cover layer hemisphere 1640 and second cover layer hemisphere 1650 are applied to inner ball 1660.

Further, top portion 1610 is configured to rotate around axle 1630 in either a clockwise or counterclockwise motion. Bottom portion 1650 may be configured to remain static during the welding process. In other embodiments, top portion 1610 may be static while bottom portion 1620 is rotated about an axle. The cover layer portion contained in the rotating portion of the welding device will rotate along with the rotating portion.

The rotating portion, whether it is the top portion or bottom portion, will rotate a rate that will cause the materials of the cover layer hemispheres to soften or melt through the friction of the materials against each other during rotation. Typically, the rotating portion will rotate at a rate of between about 1,000 rotations per minute (rpms) and about 18,000 rpms. The rate the rotating portion spins and the time period of the rotation will depend on a variety of factors. For example, the materials chosen may dictate the rate at which the portion is rotated and the length of time the portion is rotated.

When pressure is applied, top portion 1610 and bottom portion 1620 move toward each other causing the excess materials of first cover layer hemisphere 1640 and second cover layer hemisphere 1650 to come in contact with each other. The friction generated between the excess materials of first cover layer hemisphere 1640 and second cover layer hemisphere 1650 due to rotating top portion 1610 causes the materials to soften or melt. Once softened or melted, top portion 1610 stops rotating. The material of first cover layer hemisphere 1640 and second cover layer hemisphere 1650 are allowed to cool and solidify. Through the friction welding process described above, the cover layer hemisphere are joined or fused. By joining the two cover layer hemispheres, a substantially complete cover layer encompassing the inner ball is formed.

As described above, the cover layer hemispheres of the present disclosure may be formed prior to being applied to an inner ball. However, in other embodiments, the cover layer hemispheres may be formed at the same time the cover layer hemispheres are applied to an inner ball.

The cover layer hemispheres may be formed and applied to an inner ball through any suitable molding method. In some embodiments, the molding method may be a compression molding method. In other embodiments, the cover layer hemispheres may be formed and applied to an inner ball through injection molding methods. The method chosen may be based on a variety of factors. For examples, the method chosen may depend on the materials chosen for the cover layer hemispheres. In other examples, the thickness of the finished cover layer may dictate the method chosen.

FIGS. 18 and 19 illustrate a compression molding method for forming cover layer hemispheres at the same time they are applied to an inner ball. In FIG. 18, mold 1800 may include top mold plate 1810 and bottom mold plate 1820. Top mold plate 1810 and bottom mold plate 1820 may include a first surface 1860 and a second surface 1870, respectively. First surface 1860 and a second surface 1870 may contain a substantially similar dimple pattern. In other embodiments, first surface 1860 and a second surface 1870 may have different dimple patterns.

Further, situated between top mold plate 1810 and bottom mold plate 1820 may be first raw material sheet 1830 and second raw material 1840. Further, between the first raw material sheet 1830 and second raw material 1840 may be an inner ball 1850. While not shown in the figure, the molding device may further include any suitable component or device for holding the inner ball and raw material sheets in the desired location prior to compression. For example, pins or plates may hold the inner ball and raw material sheets in place. During compression the pins or plates may retract at a certain time so as to allow the components to compress and be formed as desired without defects or irregularities.

Similar to the compression molding method described above for preparing the cover layer hemisphere, top mold plate 1810 and bottom mold plate 1820 may be configured to be heated. Further, as shown in FIG. 19, top mold plate 1810 and bottom mold plate 1820 also may be configured to be pressed together such that first raw material sheet 1830 and second raw material sheet 1840 are applied to inner ball 1850 and are formed into cover layer hemispheres.

In addition, the raw materials sheets, now first cover layer hemisphere 1830 and second cover layer hemisphere 1840, shown in FIG. 19, may be joined during this process. The pressure and heat applied to the first cover layer hemisphere 1830 and second cover layer hemisphere 1840 may cause the materials to soften to the point where the two hemispheres may be joined or fused, forming a substantially complete cover layer encompassing the inner ball. In addition, in some embodiments, an adhesive may be applied during the process to join the cover layer hemispheres.

FIG. 19 shows top mold plate 1810 and bottom mold plate 1820 may be moved together. The mold plates further may be under pressure at a selected temperature for a selected period of time. As top mold plate 1810 and bottom mold plate 1820 come together the raw materials are formed into cover layer hemispheres that substantially encompass inner ball 1850. The time, temperature and pressure may fall within the ranges discussed above, and incorporated here in their entirety. In some embodiments, once formed in the mold for the selected amount of time, the finished golf ball may be cooled, allowing the softened or melted materials to solidify, and removed from the mold.

In other embodiments of the disclosure, the cover layer hemispheres may be formed and applied to an inner ball by injection molding methods. FIGS. 20 through 23 illustrate an embodiment of an injection mold and the method of using the injection mold.

Figure 20:
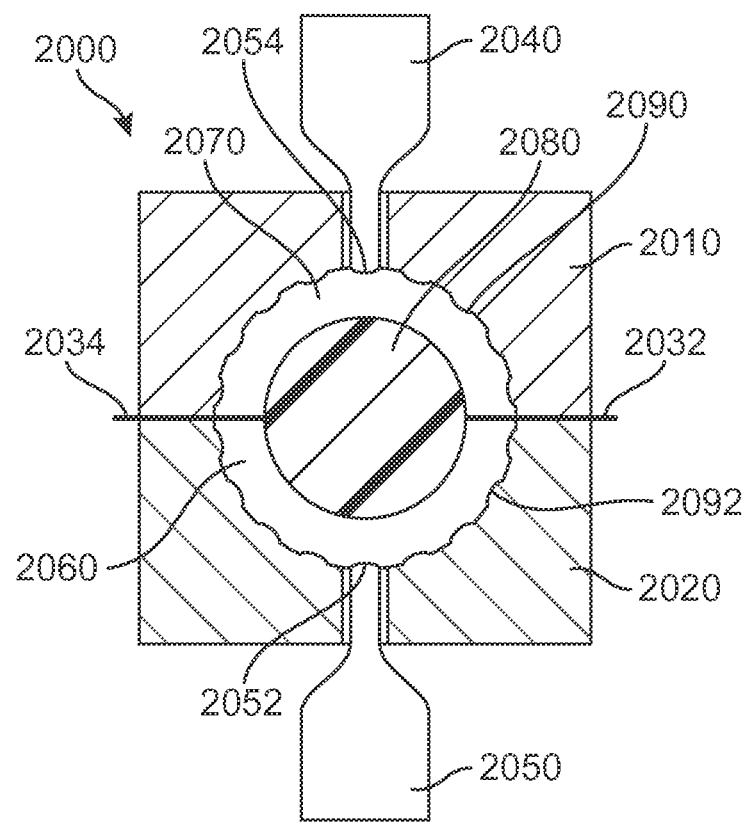
FIG. 20 shows an embodiment of an injection mold for injection molding cover layer materials to from a cover layer having two different hardness values around an inner ball where the injection mold provides for two different materials to be molded around the inner ball.

FIG. 20 shows an embodiment of injection mold 2000. Mold 2000 may be constructed of multiple portions that may be displaced relative to each other and may be brought together to define a molding chamber for a first cover layer hemisphere and a second cover layer hemisphere. For example, as shown in the embodiment of FIG. 20, mold 2000 may be a multi-part mold having an upper mold portion 2010 and a lower mold portion 2020. Upper portion 2010 and lower portion 2020 may have first interior wall 2090 and second interior wall 2092, respectively, defining a cavity or molding chamber.

First interior wall 2090 and second interior wall 2092 may include surface features that define corresponding surface features in the layer molded around the golf ball cover layer hemisphere. For example, the surface features of the molded layer may be a dimple pattern. In some embodiments, the dimple pattern of first interior wall 2090 and second interior wall 2092 may be substantially the same. In other embodiments, the dimple pattern of first interior wall 2090 and second interior wall 2092 may be different.

In addition, mold 2000 may include a first plate 2034 and a second plate 2032. The first plate 2034 and a second plate 2032, along with upper mold portion 2010 and a lower mold portion 2020, define first mold cavity 2060 and second mold cavity 2070.

In some embodiments, the plates may be substituted by a series of pins. In other embodiments, a series of pins may be included in mold 2000 in conjunction with first plate 2034 and second plate 2032.

First plate 2034 and a second plate 2032 and/or pins may be used to hold and aligned an inner ball 2080 in a desired position while the cover layer hemisphere materials are injected into the mold around inner ball 2080. Further, the plates and/or pins may be used to divide the materials being injected to form the cover layer hemispheres for a selected period of time. At the expiration of the selected time, the plates and/or pins may be retracted to allow the cover layer hemisphere materials to be joined or fused.

Mold 2000 may also define a first gate 2052 and a second gate 2054 through which a melt may be injected into second mold cavity 2070 of upper mold portion 2010 and first mold cavity 2060 of lower mold portion 2020. Although the cross-sectional view of FIG. 20 shows two gates, any number of gates may be used. Multiple gates may be used to promote better distribution of the melt throughout the mold cavity, to avoid, for example, undesirable differences in cooling and hardening in different areas of the mold cavity.

Figure 21:
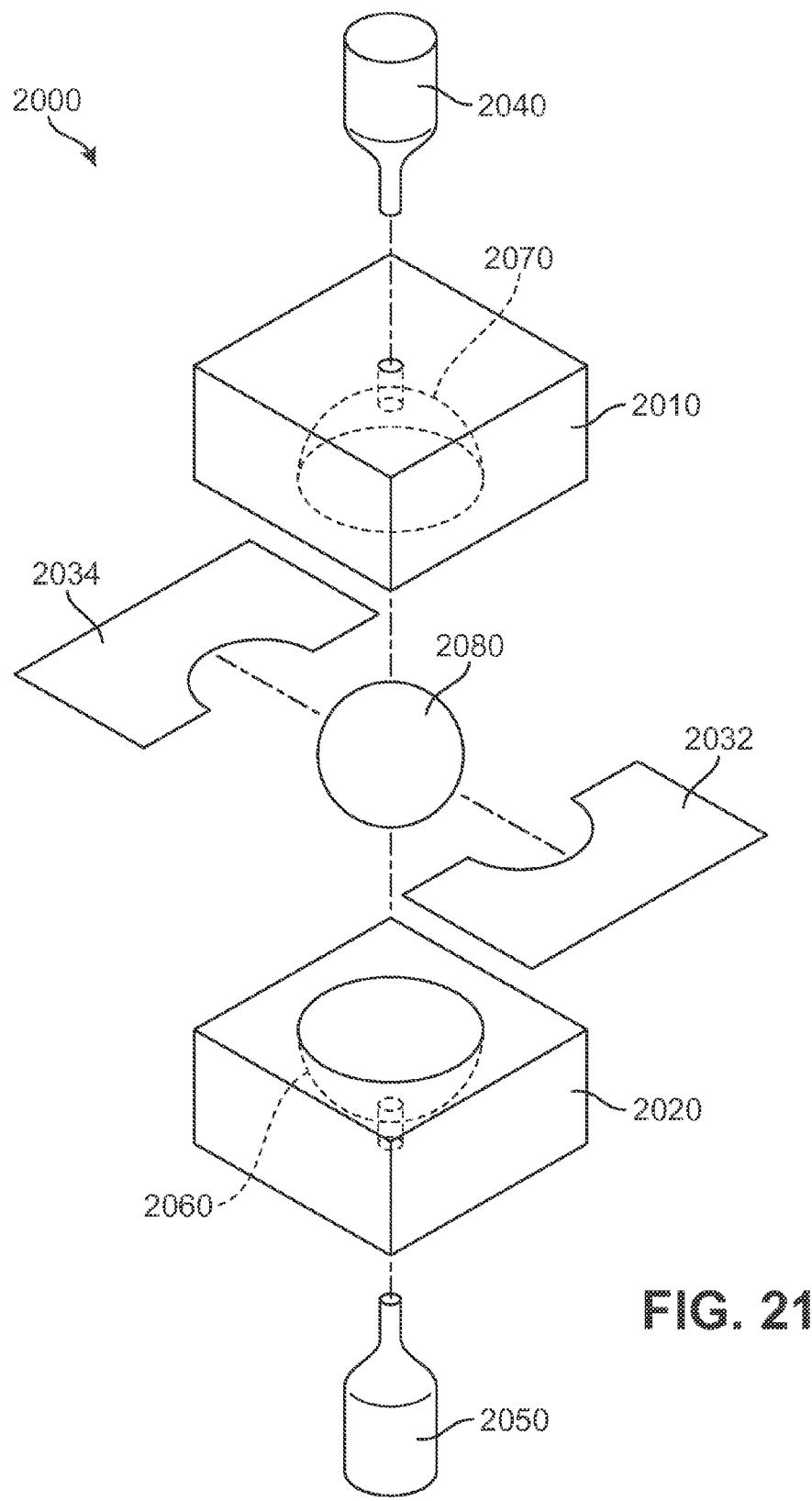
FIG. 21 shows an expended view of an injection mold of FIG. 20.

FIG. 21 illustrates an expanded view of the embodiment depicted in FIG. 20. Again, FIG. 21 shows an embodiment having first plate 2032 and second plate 2036 that may hold inner ball 2080 in a desired position while molten cover layer material is injected into the mold cavities from first injector 204 and second injector 2050.

Figure 22:
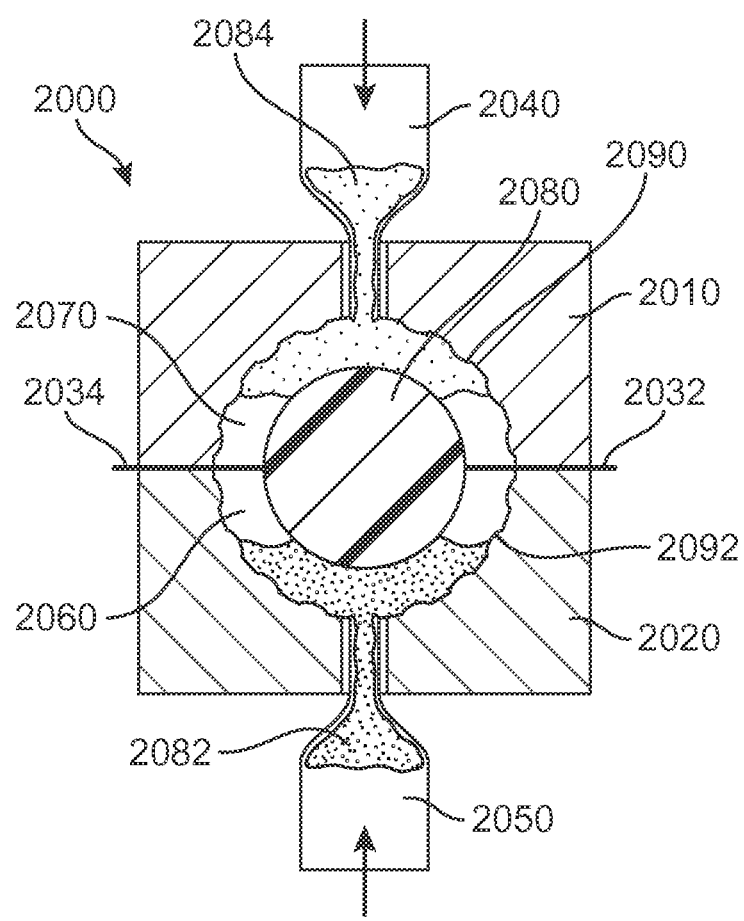
FIG. 22 shows an embodiment of an injection mold where the two cover layer materials are being injection molded around an inner ball.

In one embodiment, the two cover layer hemisphere molding materials may be injected into the mold in liquid form, and then allowed to cool and solidify. As shown in FIG. 22, first gate 2052 and second gate 2054 are opened to allow the first material 2082 and second material 2084 to flow from first injector 2040 and second injector 2050 into first mold cavity 2060 and second mold cavity 2070. Once first mold cavity 2060 and second mold cavity 2070 are filled with first material 2082 and second material 2084, respectively, the materials are allowed to cool and solidify.

Figure 23:
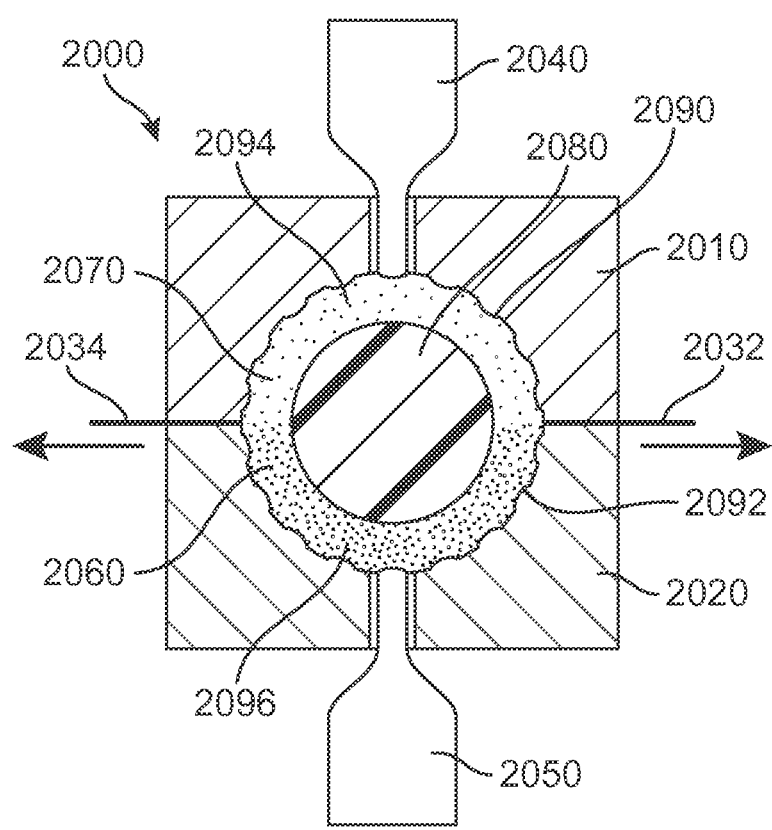
FIG. 23 shows the injection mold of FIG. 22 where a separation component is retracted so the cover layer hemispheres are joined forming the cover layer.

Prior to completely cooling and solidifying, first plate 2032 and second plate 2036 are retracted. As shown in FIG. 23, retracting first plate 2032 and second plate 2036 allows the first material 2082 in mold cavity 2060 to join or fuse to second material 2084 in mold cavity 2070. The joined or fused first cover layer hemisphere 2094 and second cover layer hemisphere 2096 substantially complete a golf ball cover layer and encompass inner ball 2080.

Figure 24:
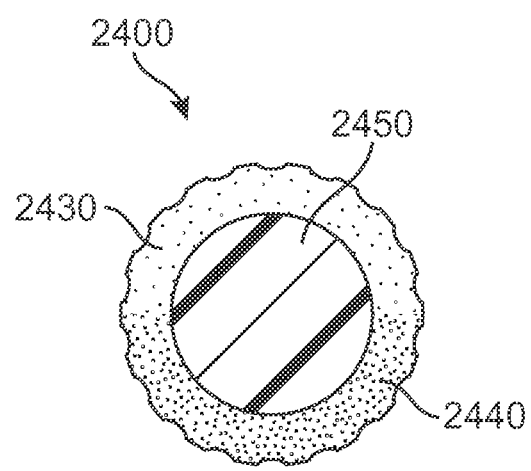
FIG. 24 shows an embodiment of a finished golf ball having a cover layer with two hardness values.

Once the cover layer hemisphere materials are cooled and solidified, the finished golf ball may be removed from mold 2000. FIG. 24 shows an embodiment of the disclosure where a finished golf ball 2400 includes inner ball 2450 and a cover layer comprising first cover layer portion 2430 having one hardness and second cover layer portion 2440 having a second hardness.

A golf ball of the present disclosure prepared by the methods described above has at least two cover layer portions having different hardness values. The golf ball of the disclosure exhibit good distance when hit with a golf club on the area of the cover layer that has a harder surface. In addition, the golf ball of the disclosure exhibits a soft feel and better control when hit with a golf club on the portion of the cover layer that has a softer surface. The golf ball may have a harder surface for use when swinging a driver or wood. In addition, the golf ball of the disclosure may have a softer surface for use when swinging a short iron, wedge or putter. When playing with the golf ball of the disclosure, a golfer has a golf ball that will provide the desired play characteristics of a wide variety of shots a golfer may perform during a round of golf.

Further, the golf ball of the present disclosure may be utilized in any ball fitting methods for determining which type of ball is best suited for a particular golfer. Typically, a kit of several ball having different play characteristics is included in a ball fitting process. By including golf balls with two cover layer portions having different hardness values, the number of balls necessary for the kit and the ball fitting process may be reduced.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

What is claimed is:

1. A golf ball comprising:
   a core;
   a cover layer encompassing the core, the cover layer comprising a first hemispherical cover layer portion consisting of a first material having a first hardness and a second hemispherical cover layer portion consisting of a second material having a second hardness; and
   wherein the first hardness is different than the second hardness.

2. The golf ball according to claim 1, wherein the first cover layer portion has a first marking or color, the second cover layer portion has a second marking or color, wherein the first marking or color is different from the second marking or color.

3. The golf ball according to claim 1, wherein the first cover layer portion has a first dimple pattern, the second cover layer portion has a second dimple pattern, wherein the first dimple pattern is different from the second dimple pattern.

4. The golf ball according to claim 1, wherein the first cover layer portion comprises a first ionomer resin with the first hardness and the second cover layer portion comprises a second ionomer resin having the second hardness.

5. The golf ball according to claim 1, wherein the first cover layer portion comprises a first thermoplastic polyurethane having the first hardness and the second cover layer portion comprises a second thermoplastic polyurethane having the second hardness.

6. The golf ball according to claim 1, wherein the first cover layer portion comprises an ionomer resin having the first hardness and the second cover layer portion comprises a thermoplastic polyurethane having the second hardness.

7. The golf ball according to claim 1, further comprising an inner ball encompassed by the cover layer; and wherein the inner ball includes the core.

8. A method of making a golf ball comprising:
preforming a first cover layer hemisphere consisting of a first material having a first hardness value;
preforming a second cover layer hemisphere consisting of a second material having a second hardness value; wherein the first hardness value is different from the second hardness value
applying the first cover layer hemisphere and second cover layer hemisphere to an inner ball; and
joining the first cover layer hemisphere and second cover layer hemisphere to form a cover layer that encompasses the inner ball.

9. The method according to claim 8, wherein the first cover layer hemisphere and second cover layer hemisphere are formed by compression molding.

10. The method according to claim 8, wherein the first cover layer hemisphere and second cover layer hemisphere are formed by injection molding.

11. The method according to claim 8, wherein the first cover layer hemisphere and second cover layer hemisphere are applied to the inner ball by compression molding.

12. The method according to claim 8, wherein the first cover layer hemisphere and the second cover layer hemisphere are applied to the inner ball through a welding method.

13. The method according to claim 12, wherein the welding method is a spin welding method.

14. A method of making a golf ball comprising:
forming a first cover layer hemisphere from a first material having a first hardness value;
forming a second cover layer hemisphere from a second material having a second hardness value; wherein the first hardness value is different from the second hardness value
applying the first cover layer hemisphere and the second cover layer hemisphere to an inner ball; and
joining the first cover layer hemisphere and the second cover layer hemisphere to form a cover layer that encompasses the inner ball,
wherein forming first cover layer portion and second cover layer portion and applying the cover layer portions to an inner ball occur simultaneously.

15. The method according to claim 14, wherein the forming steps and applying step are performed by a compression molding method.

16. The method according to claim 14, wherein the forming steps and applying step are performed by an injection molding method.

17. The golf ball according to claim 7, wherein an edge of the first hemispherical cover portion is fused to an edge of the second hemispherical cover portion to form the cover layer about the inner ball.

18. The golf ball according to claim 17, wherein each of the first hemispherical cover portion and the second hemispherical cover portion is preformed.

19. The golf ball according to claim 1, wherein the difference in the hardness between the first hemispherical cover portion and the second hemispherical cover portion is between about 1 and about 15 units, measured on the Shore D scale.

20. The golf ball according to claim 1, wherein the core includes an inner core layer and an outer core layer.

* * * * *